(12) United States Patent
Ouimet

(10) Patent No.: US 7,467,095 B2
(45) Date of Patent: Dec. 16, 2008

(54) STRATEGIC PLANNING AND OPTIMIZATION SYSTEM

(75) Inventor: Kenneth J. Ouimet, Scottsdale, AZ (US)

(73) Assignee: SAP AG (DE)

( * ) Notice: Subject to any disclaimer, the term of this patent is extended or adjusted under 35 U.S.C. 154(b) by 807 days.

(21) Appl. No.: 10/633,249

(22) Filed: Jul. 31, 2003

(65) Prior Publication Data

US 2004/0024715 A1    Feb. 5, 2004

Related U.S. Application Data

(63) Continuation of application No. 09/951,334, filed on Sep. 10, 2001, which is a continuation-in-part of application No. 09/084,156, filed on May 21, 1998, now Pat. No. 6,308,162.

(60) Provisional application No. 60/049,948, filed on May 21, 1997, provisional application No. 60/049,826, filed on May 21, 1997.

(51) Int. Cl.
G06F 9/44 (2006.01)
G06F 17/50 (2006.01)
G06F 17/60 (2006.01)
G06F 17/00 (2006.01)

(52) U.S. Cl. ................... 705/7; 703/2; 705/400

(58) Field of Classification Search ........... 700/90, 700/103; 702/182; 705/1, 7, 400, 5, 6, 8, 705/10, 9, 11; 706/13, 16, 19; 703/2
See application file for complete search history.

(56) References Cited

U.S. PATENT DOCUMENTS 4,887,218 A    12/1989    Natarajan (Continued)

FOREIGN PATENT DOCUMENTS

WO    WO 92/22021 A1 *    12/1992

(Continued)

OTHER PUBLICATIONS

Weaver: "Will Utilities Scrub Now and Profit Latter? Braine: Don't Buy EPA's $1,550 Per Ton Allowances"; Energy Daily, Jan. 14, 1991, vol. 19, No. 9.*

(Continued)

*Primary Examiner*—Igor N. Borissov
(74) *Attorney, Agent, or Firm*—Jordan M. Meschkow; Lowell W. Gresham; Charlene R. Jacobsen

(57) ABSTRACT

A computer program for strategic planning and optimization allows a user to model an enterprise to visualize an effect of a strategic constraint on a primary goal of the enterprise. The primary goal is represented by a primary objective function which, in turn, depends upon a set of operational variables. The strategic constraint is represented by a constraint function that depends upon a subset of the operational variables. An effective objective function is constructed by combining the primary objective function and the constraint function, and the effective objective function is optimized over a range of target values for the constraint function. An outcome of the primary objective function is determined for each target value, and a graphical view of the outcome for each of the target values is presented. The graphical view provides a visualization of the effect of the strategic constraint on the primary goal for managing the enterprise.

6 Claims, 15 Drawing Sheets

U.S. PATENT DOCUMENTS

| | | | | |
|---|---|---|---|---|
| 5,267,346 A | * | 11/1993 | Maruyama et al. | 706/62 |
| 5,377,095 A | | 12/1994 | Maeda et al. | |
| 5,442,730 A | | 8/1995 | Bigus | |
| 5,521,814 A | * | 5/1996 | Teran et al. | 700/266 |
| 5,630,070 A | | 5/1997 | Dietrich et al. | |
| 5,655,118 A | | 8/1997 | Heindel et al. | |
| 5,745,880 A | * | 4/1998 | Strothmann | 705/7 |
| 5,754,857 A | | 5/1998 | Gadol | |
| 5,767,848 A | | 6/1998 | Matsuzaki et al. | |
| 5,946,662 A | | 8/1999 | Etti et al. | |
| 5,950,170 A | | 9/1999 | Pan et al. | |
| 5,963,911 A | | 10/1999 | Walker et al. | |
| 6,110,214 A | * | 8/2000 | Klimasauskas | 703/2 |
| 6,308,162 B1 | * | 10/2001 | Ouimet et al. | 705/7 |
| 2002/0184069 A1 | * | 12/2002 | Kosiba et al. | 705/8 |
| 2004/0019519 A1 | * | 1/2004 | Tani et al. | 705/10 |

FOREIGN PATENT DOCUMENTS

| | | |
|---|---|---|
| WO | WO 95/26007 A1 * | 9/1995 |
| WO | WO 98/53416 A1 * | 11/1998 |

OTHER PUBLICATIONS

"W. Press et. al., Numerical Recipes: The Art of Scientific Computing, Cambridge University Press, New York (1992)".*

Dauer & Krueger, "A Multi-Objective Optimization Model for Water Resources Planning," Appl. Math. Modeling, 1980, vol. 4 Jun. pp. 171-175.

Gross & Talavage, "A Multiple-Objective Planning Methodology for Information Service Managers:; Information Processing & Management", vol. 15 pp. 155-167, Jan. 1979.

Ray et al, Master production scheduling for a process industry environment; International Journal of Operation Management v14n10, Dec. 1994.

"Promoman", Promotion Management System, Neilsen Marketing Research, 1992.

Ruth N. Bolton, "The Robustness of Retain-Level Price Elasticity Estimates", Journal of Retailing, vol. 65, No. 2, Summer 1989.

Cox, et al., "Competing On Price: The Role of Retail Price Advertisements In Shaping Store-Price Image", Journal of Retailing, vol. 66, No. 4, Winter 1990.

Allenby et al, "Reassessing Brand Loyalty, Price Sensitivity and Merchandising Effects on Consumer Branch Choice", Journal of Bus & Economic Statistics, Jul. 1955, vol. 13, No. 3.

Schindler et al., "Increased Consumer Sales Response Through Use of 99-Ending Prices", Journal of Retailing, vol. 72(2), pp. 187-199.

* cited by examiner

Select Goals

>_

Select Primary Goal

1. Select Predefined Primary Goal
        a. Maximize Gross Profits:
$$\Pi = \sum Q_i(P_i - C_i)$$
        b. Maximize Total Sales:
$$\Pi = \sum Q_i P_i$$

2. Define New Primary Goal

Select Auxiliary Goal

3. Select Predefined Auxiliary Goal
        c. Maintain Overall Price Image:
$$\phi = \frac{1}{N} \sum_{i=1}^{N} \frac{P_i}{\overline{P_i}} \times w_i$$

4. Define New Auxiliary Goal

Q. Return to Main Menu

Figure 7

| ψ | Π | φ |
|---|---|---|
| 1 | $10,000 | 0 |
| 2 | $11,000 | 1 |
| 3 | $12,000 | 2 |
| 4 | $13,000 | 3 |
| 5 | $14,000 | 2 |
| 6 | $15,000 | 1 |
| 7 | $16,000 | 2 |
| 8 | $17,000 | 3 |

Constraint Overview Table

| $\phi^{targ}$ | $\psi^{high}$ | $\psi^{low}$ |
|---|---|---|
| 0.5 | 1 | 2 |
| 2.5 | 3 | 4 |
| 2.5 | 4 | 5 |
| 3.5 | NULL | NULL |

$\{\phi^{bound}\}$

Figure 9

Enter Weighting Rang

>_

1. Select Minimum Value: $\psi^{min}$

2. Select Maximum Value: $\psi^{max}$

3. Select Resolution: $\delta\psi$

4. Continue Constraint Mapping Routine

Figure 10

STRATEGIC PLANNING AND OPTIMIZATION SYSTEM

RELATED INVENTION

This application is a continuation of and claims the benefit of U.S. patent application Ser. No. 09/951,334, filed 10 Sep. 2001, still pending, which is specifically incorporated herein, in its entirety, by reference, which in turn is a continuation-in-part of U.S. patent application Ser. No. 09/084,156, filed May 21, 1998, now U.S. Pat. No. 6,308,162, and which in turn claims the benefit of U.S. Provisional Application No. 60/049,948, filed May 21, 1997 and U.S. Provisional Application No. 60/049,826, filed May 21, 1997 all of which are incorporated by reference herein.

BACKGROUND OF THE INVENTION

1. Area of the Art

The present invention relates to planning models, and more particularly, to a method for optimizing a planning model while managing strategic objectives.

2. Description of the Prior Art

As information technology continues to penetrate into all aspects of the economy, a wealth of data describing each of the millions of transactions that occur every minute is being collected and stored in on-line transaction processing (OLTP) databases, data warehouses, and other data repositories. This information, combined with quantitative research into the behavior of the value chain, allows analysts to develop enterprise models, which can predict how important quantities such as cost, sales, and gross margin will change when certain decisions, corresponding to inputs of the model, are made. These models go beyond simple rules-based approaches, such as those embodied in expert systems, and have the capability of generating a whole range of decisions that would not otherwise be obvious to a designer of rules-based systems.

There is however a problem with the use of model-based decision-making tools. As the decision-making process is automated, the operational decisions that are recommended by the model may begin to deviate from broader considerations that are not specifically built into the enterprise planning model. The reason for this is that an economic model can realistically succeed only on either a small scale or large scale, but not on both. Incorporating both small scale decisions and large scale decisions into a single enterprise planning model would result in a model of enormous complexity, making the optimization of the enterprise planning model computationally impractical, and economically inefficient.

The importance of this problem can be illustrated with an example from the retail industry. A retailer can use a demand model to accurately forecast each item's unit sales given the item's price and other factors. However, if the demand model is used directly to optimize pricing decisions, it will generate prices that vary greatly from those of a human pricing manager. This is because a demand model has no knowledge of the enterprise's strategic objectives, and therefore generates prices that do not reflect the company's overall strategic pricing policy. That is, a business enterprise does not blindly set prices with an aim towards a maximum number of sales. Rather, each business follows an overall strategy that it hopes will allow it to succeed economically in the long run.

One example of business strategy and strategic goals is the "price image" of a retailer. Some retailers position themselves as "high end" operations. They stock more expensive goods and often a more extensive range of goods. Often the retail surroundings are expensive in appearance and a large amount of individual attention is given to each customer. The customer naturally expects prices to be higher at a "high end" retailer. On the opposite end of the scale is the low cost or discount retailer. Here the prices are lower-often much lower—but the stock selection may be limited, the surroundings are spartan and individual customer service may be nonexistent. Well known economic models tell us that the lower prices of the discount retailer will result in sales of more units. Yet this does not necessarily translate into increased profit.

In maintaining a "high end" image, the retailer eschews the volume sales that discount pricing may afford. The higher prices stemming from a high price image operation may yield considerable profit. A careful cultivation of a particular price image can readily result in economic success both for the high end and the low end retailer. In the sense of economic ecology, such pricing strategies place the retailers in different niches so that they do not directly compete with each other. Maximizing the number of niches increases the possible number of retailers and maximizes the amount of money they can extract from the economy. This is but one example of a strategic decision or goal. An ordinary enterprise model cannot combine optimization of enterprise decisions with the retailer's strategic goals; consequently, the model's utility is greatly impacted. This inability to align and optimize an enterprise's operational decisions with its strategic objectives is a huge problem, and results in billion-dollar pricing inefficiencies in the retailing industry alone.

SUMMARY OF THE INVENTION

The present invention provides a computer-implemented method and system for controlling the optimization of a planning model while simultaneously satisfying at least one strategic objective. Until now, there has been no way for a manager to easily visualize the tradeoffs involved in setting different strategic goals. A pricing manager, for example, may need to understand the tradeoffs involved in driving towards a lower price image to compete with a key competitor. Hence, a question that arises is how a lower price image might affect profits.

This is not a simple question. A pricing manager may be responsible for pricing over one thousand products. If he were to consider ten different possible prices for each product and then wish to consider every possible pricing scenario (each scenario being a different combination of items with each item having a different possible price), the pricing manager would be faced with $10^{1000}$ different pricing scenarios. Considering that there are only about $10^{40}$ atoms in the entire universe it is not difficult to imagine that even the fastest computers can't explore all possible permutations in any reasonable amount of time.

Another question that arises is what it might look like to calculate and plot profits and price image for every possible pricing scenario. Each pricing scenario, i.e., a unique set of prices for each product, has a price image and a profit associated with it. Referring to the FIG. 1, each pricing scenario corresponds to one point in the profit vs. price image graph. There are three important regions labeled in the graph of FIG. 1: A) inefficient pricing, this indicates that a different mix of prices can achieve the same price image with greater profits; B) unachievable, this indicates a level of profits that is unachievable through pricing manipulation alone; and C) an envelope of optimum pricing scenarios. This envelope of optimum pricing scenarios is what the manager needs to visualize to make an informed pricing decision.

FIG. 1 also represents the already mentioned relation between profit and price image. In the graph, the vertical axis represents profit from each scenario (sale of a group of priced items) while the horizontal axis represents price image (that is, an aggregate higher price). As the aggregate price increases, the profit increases until the overall high price begins to impact sales. The optimum pricing envelope indicates the highest profit scenario for each different gradation of price image. This makes the profit tradeoffs very clear regardless of the price image strategy (strategic objective) that is chosen by a particular retailer.

There are a number of strategic objectives used in business planning. In retail industries, many of these objectives are related to price. Price index is a commonly used measure that can have strategic import. A price index is simply a direct mathematical comparison between a retailer's prices and that of a competitor. This does not involve any psychological effects of pricing on the shoppers. To some extent this is a strategic objective based on the old maxim "all the market will bear." The tradeoff is between a lower price index (lower prices) and a higher profit. If a retailer's price index is consistently below his competitors, his profits per unit sale will be lower although increase in sales volumes may increase overall profits. The Price Index takes the general mathematical form of:

$$\phi = \frac{1}{N} \sum_{i=1}^{N} \frac{P_i}{\overline{P}_i} \times w_i$$

Here the sum is over all prices and the weight factor, w, is usually either a dollar or a unit sales factor.

However, simple Price Indices have two major flaws: 1) they infer how shoppers might respond to relative price differences, but they don't measure actual responses; and 2) Price Indices are not defined for "blind items"—that is, items for which the retailer does not know the competitors' prices. Since such competitive data can be difficult and/or expensive to collect, it is not unusual that a retailer may have little more than a small sample of his competitors' data.

The solution to this problem is to express the Price Index in the form of the closely related Price Image. The overall concept of Price Index has already been explained.

However, in the present invention Price Image can readily be expressed in the following form:

Price Image=SUM($w_i$*($US_i[C_i]-US_i[P_i]$))

Here the sum is over all prices, w is a weight, US[P] is the forecasted unit sales at price P, and C is the cost. As the price of an item is decreased, the unit sales increase and the overall price image decreases. When all items are sold at cost ($P_i=C_i$), the price image is zero. Because the parameters of a demand model are tuned using historical sales data, such a model forecasts from previous responses how shoppers will respond to price changes and can be defined with or without data from competitive prices ("blind items").

Service Time is yet another strategic objective. Service time is a measure of how long it takes a given customer to obtain service. The objective of decreasing service time will increase operational and capital expenses. For example, in a retail setting, such as a busy supermarket, decreased service time requires more checkout lines with a concomitant increase in operational costs (more checkers) and capital expenses (more point of sales terminals). Yet decreased service time may well result in increased sales volumes. These same factors apply to non-retail business such as service or repair industries.

Another strategic objective is that of Risk. This is a measure of potential costs to a company. Risk could come from purchasers returning products, defaulting on loans or collecting on guarantees. Here the strategic decision is between decreasing the risks and increasing the profits.

Product Availability is a strategic objective or decision that can affect sales and profits independent of pricing strategy. Product availability is a measure of how often a product is available for immediate purchase. Certainly, a consumer is not pleased to discover that the desired beach stool is not available. This unavailability may well lose the immediate sale of the unavailable stool. However, the customer may well leave the store without purchasing other items they would have purchased had the item been available. However, increasing product availability generally increases carrying and inventory costs. So the tradeoff is increasing availability versus minimizing carrying and inventory costs.

A related strategic objective is that of Product Selection. This is a measure of the variety of products or services that a company offers. Increased product selection may result in increased purchases by customers on one hand and higher inventory, space and operations costs on the other hand.

Market Share is a strategic objective that measures the fraction of a market that is purchased from a given company as opposed to aggregate purchases for all competitors. Here the strategic decision is increasing market share versus increasing profits.

Revenue is a strategic objective that is a measure of all incoming money. Companies generally wish to increase overall revenue. This is related to market share, and the tradeoff is that of increasing profits versus increasing overall revenue. FIG. 2 shows the steps in an automated optimization of revenue. The graph represents the relationship between product margin (profit per sale) and revenue. As the margin decreases (e.g., the price decreases), the overall revenue initially increases as sales volumes increase. Eventually revenue remains stationary as the margin continues to decrease because increases in sales volume do not compensate for the loss in per unit revenue (e.g. lower price per unit). The optimization routine successively analyzes the margin/revenue envelope to determine the scenario that gives the highest margin (profit) and the highest revenue.

The basic invention comprises a sophisticated enterprise planning model that allows a user to optimize and strategically manage an enterprise based on a variety of decisions. The user will select a planning model which will include many different types of decisions. Pricing is not necessarily a component of a planning model. A logistics planning model may only consider which route to take—that is many non-price related decisions can and do have major impacts on revenue and profitability.

In configuring the invention the user must first select and define a primary objective or goal. The most common primary objective is profit, although overall revenue, market share, risk-adjusted income as well as related factors that are user defined can form the primary objective. In the present invention it is possible to set up multiple primary objectives which can be weighted or treated in order. Within these primary objectives, negative or constraint factors can be treated as well as positive factors such as profit. The objectives contain or subsume decision variables that must be optimized to attain the objective. For example, a major decision that affects profit is price. A planner sets the price of each item based on actual constraints (like the actual cost of the goods) with a view towards maximizing profit. A planning model can simulate a large number of possible price decisions and based on real historical sales data can predict the decisions (prices) to reach the primary objective (produce the optimum profit).

After the primary objective(s) is selected, the present invention allows the optimization of the selected decisions in view of one or more strategic objectives. The general subject of strategic objectives has been discussed above. Unlike the primary objective and the tactical or physical constraints, strategic objectives are not fixed or known in advance. Strategic objectives depend on the manager's judgement; they represent strategic decisions where the manager must consider one or more tradeoffs that the manager may choose to take, with the idea that the tradeoff will actually produce a benefit in the long run. As explained in regard to FIG. 1, the invention calculates a large number of scenarios and presents the results in a graphic form so that the optimum decision envelope can be visualized for the selected primary objective(s) in light of the selected strategic objective(s). This allows the manager to see the tradeoff involved with the selected strategic objectives(s). A number of possible strategic objectives (including weighted combinations of strategic objectives) can be compared so that the manager has advance knowledge of the cost of the strategic decisions made. The model helps to select the strategy based on the cost of the strategy, but the actual strategic planning and its implications depend on the skill and the knowledge of the manager.

It should be apparent that one of the strengths of the current invention is the flexible tool it provides to the managers. An additional flexibility is provided in the choice of the optimization method used to produce the various price scenarios of the enterprise planning model. There are a large number of optimization methods known in mathematics. The best optimization method depends upon the characteristics of the specific enterprise model being implemented. For this reason it can be advantageous to allow the user to choose the optimization method and to even compare the results of various optimization methods.

In general, enterprise planning models can be quite complex where the decision variables are non-linear, coupled, and discontinuous if not discrete. For this general class of problems common optimization algorithms are Ant Algorithms, Genetic Algorithms, Simulated Annealing, and others such as Evolutionary Methods, Branch and Bounds, Clustering Methods and Tabu Search Methods. New algorithms are constantly being developed and the present invention is designed so that the user can incorporate user defined optimization algorithms.

For specific enterprise planning models, there can be much more efficient ways of optimizing than these general algorithms. Take, for example, an enterprise planning model where both the primary objective and strategic objectives have no terms that couple the decision variables. Since there is no coupling, each decision variable can be optimized independently, saving a tremendous amount of time. In some cases it is even possible to produce simple analytic expressions for the optimum values.

The present invention is preferably used through a graphic users interface. In a preferred embodiment, a user is presented with a menu on a display device. Using an input device, the user first selects a primary goal(s)/objective(s) to be realized—e.g., maximize gross profits. The primary goal or objective is represented by a primary objective function which is dependent upon a set of operational variables. Each of the operational variables represents a single operational decision that the user seeks to optimize in order to reach the primary goal. Next, the user optionally selects one or more strategic objectives that the user would also like to be realized. The strategic objectives can be represented by constraint functions that are dependent upon a subset of the same set of operational variables as used by the primary goal.

Next, an effective objective function is constructed by combining the primary objective function with the strategic objectives, each being multiplied by a weighting factor. The resulting effective objective function depends on the same set of operational variables. The effective objective function is then optimized with respect to each of the decision variables, with the enterprise data providing physical constraints on the optimization process. The precise optimization process depends on the user's selection of optimization methods. As a result of the optimization, optimal values for each of the decision variables is obtained. The optimal values of the decision variables represent a set of operational decisions that should achieve the primary objective and the strategic objective.

The effective objective function can be optimized through a range of values of the weighting factor, with the results stored in a table. This computed table essentially provides a relationship between different optimized values of the primary objective, the strategic objective, and the values for the decision variables. These data are conveniently represented in a graphic form as in FIG. 1. The optimal pricing envelope clearly shows the user the effect of the strategic objective. The user is thus provided with a way to specify a target value for the strategic objective to attain and can use the table to interpolate the value for the weighting factor that corresponds to the target value. This interpolated value for the weighting factor is then inserted into the effective objective function. The effective objective function is optimized, yielding the set of operational decisions which optimize the primary objective function while at the same time satisfying the constraint(s) of the strategic objective(s) allowing the manager to readily determine the costs and benefits of various possible strategic objectives.

BRIEF DESCRIPTION OF THE DRAWINGS

FIG. 7 is a picture of an example of the input prompts displayed on the display device in a preferred embodiment of the Function Selection routine;

FIG. 9 shows examples of data structures stored in memory for a Constraint Overview table and a corresponding list of bounds;

FIG. 10 is a picture of an example of the input prompts displayed on the display device in a preferred embodiment of the Constraint Mapping routine;

DETAILED DESCRIPTION OF THE PREFERRED EMBODIMENTS

Figure 1:
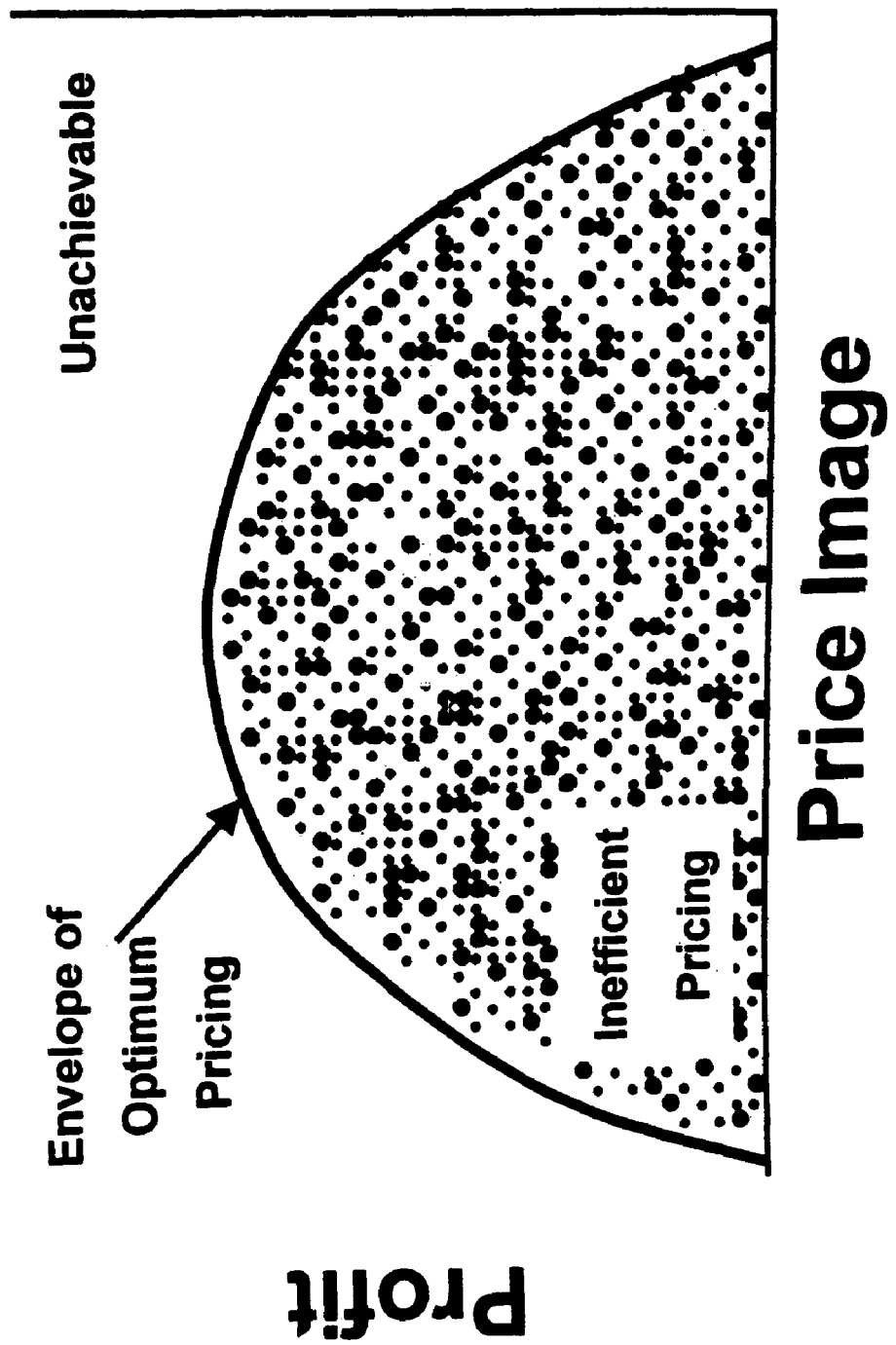
FIG. 1 shows a graphic representation of an optimum pricing envelope displaying profit versus a strategic objective (price image)
Figure 2:
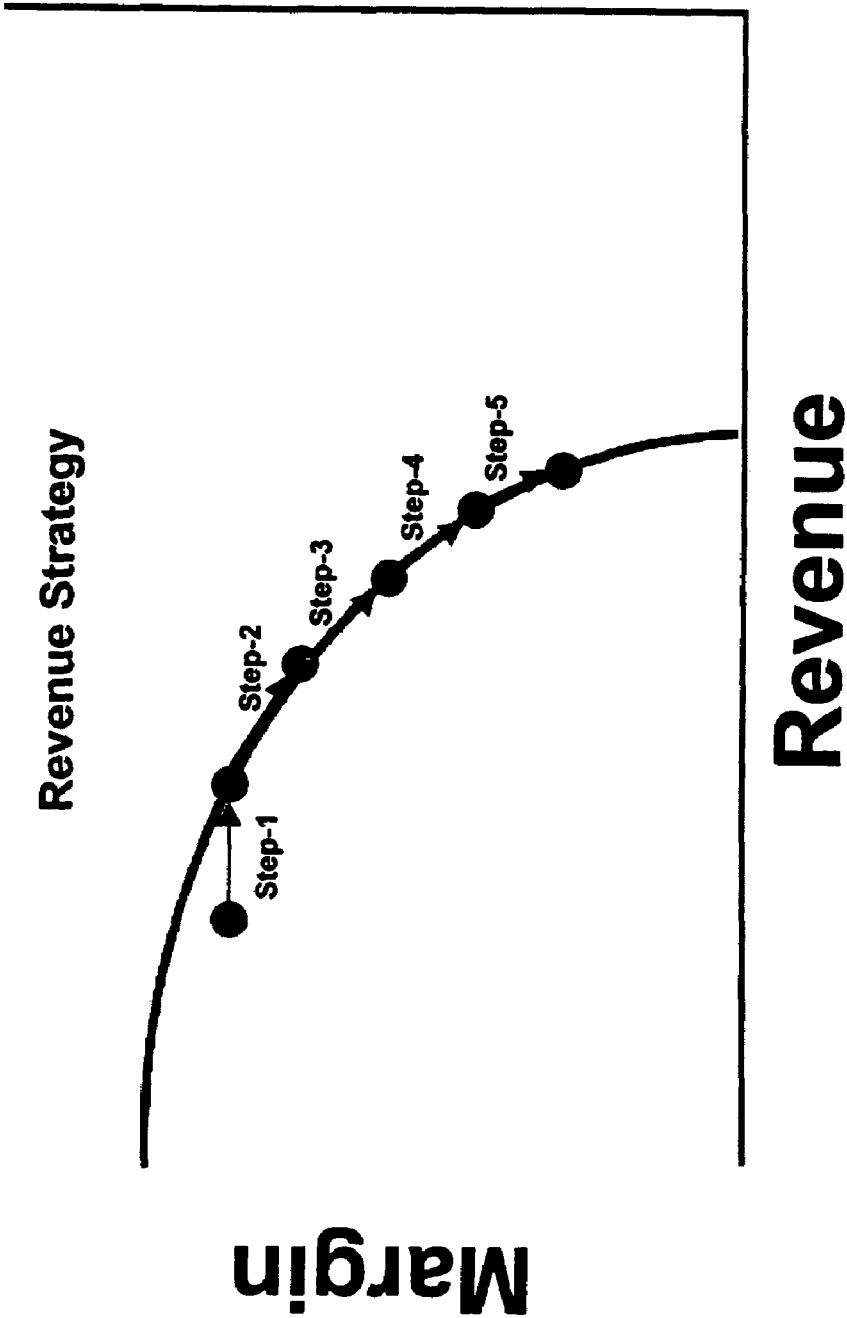
FIG. 2 shows a display of an optimum pricing envelope with a different strategic objective (revenue)

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an automated Strategic Planning and Optimization System.

Planning Model

The present invention provides an automated system for implementing a strategic planning model. Such models allow optimizations based on a variety of decision variables. Essentially, these variables can be any of a large number of decisions that must be made in planning a business. The following discussion should not be considered as exhaustive, but price is certainly one of the most apparent decisions that most business planners face. Other decision variables include promotional media (how should the product or products be promoted—how much should be spent—what approach should be used, etc.). In terms of a profit objective if too much money is spent on promotion, profits may be reduced, but if too little is spent sales will doubtless be decreased. Similar decisions revolve about promotion date (how soon before a sales event should the promotion be launched) and promotional duration (how long should the promotion continue) as well as promotional discount (which items should be put on sale and how much should the price be decreased below the usual optimized price).

There are a variety of other decision variables that can be made and modeled. Especially where particular goods are seasonal or likely to have model changes or otherwise become obsolete, the quantity of the good that should be purchased becomes a decision variable. Too large of a purchase will result in remainders that must be sold at a discount or a loss. Too small of a purchase may make it impossible to satisfy demand with the result that customers take their business elsewhere. For seasonal goods the decision variable is the question of when the goods should be purchased by the retailer. Peak season prices may be higher. Very early purchases may have lower purchase prices but capital is expended prematurely and the goods may then have to be stored before actual sale. Late purchases may have very attractive prices but may miss the peak demand by the customers. Similarly, it is important to determine the product location within the store and the amount of shelf allocated to a particular product and/or to a particular class of products. Overall selection of products is an important decision variable. How many different products within one product class should be stocked. How many different product classes should the establishment cover. There are many additional decision variables that may be important to particular users. The present invention permits ready customization so that other user specific decision variables can be added.

OBJECTIVE AND CONSTRAINTS

Aggregate Measures

A basic planning model uses historical data to simulate the outcome of altering one or more decision variables. Generally, the interactions of the decision variables are expressed in terms of a primary objective (such as profit) that itself is often an aggregate measure of a number of separate decision variables. That is, the ultimate "product" of the model is suggested values for one or more decision variables; however, the goal or primary objective that invokes the decision variables is a global aggregate measure that subsumes the individual decision variables.

For convenience of the user, the system lists the various aggregate measures in an Aggregate Measures table from which the user can make a selection for any particular simulation. Examples of such aggregate measures include:

Profit

Cost

Revenue

Price Index

Price Image

Service Level

Marginal Cost of Revenue

Marginal Cost of Image

Risk-adjusted Income

Number of Price Changes

Shelf Length

Number of Displays

User Defined

The User Defined Measures include a weighted mix of any of the previously defined aggregate measures.

Note that the task of selecting the Primary Objective from the Aggregate Measure Table may also include the further task of selecting whether the Objective is to be maximized or minimized. Strategic Objectives are also included in the Aggregate Measure Table and are selected by the user. The system gives the user the option of ranking the multiple Strategic Objectives in terms of weights to prioritize multiple strategic objectives or in terms of a target value for a particular Strategic Objective. When presented with a target value for a Strategic Objective, the system operates to find the proper weight for the Objective that will yield the target value after optimization. When presented with the weight of a Strategic Objective, the system proceeds to optimize the model in light of that weight.

Finally, some of the entries on the Aggregate Measures Table are neither decision variables per se nor Strategic Objectives per se. Rather they are Tactical Constraints which operate as decision-level constraints with a possible strategic import. Typical Tactical Constraints include a maximum or minimum price for an item or class of items, and a defined relationship between prices (for example, the price of item n must be less than or equal to the price of item m. Overall ceilings or floors can also be set for Tactical Constraints; for example, the system can be constrained so that the overall price change is less than a given percentage.

Optimization Methods

The automated planning model operates by calculating the outcomes for a large number of individual scenarios involving the selected decision variables as determined by items from the Aggregate Measures Table as well as Strategic Objectives and Tactical Constraints. Various Optimization Methods or algorithms can be employed. The best choice of optimization method depends on the characteristics of the specific model being implemented. In most cases the best result is obtained by allowing the user to select several optimization methods and to compare the results obtained by using a variety of methods on the same data set (goals and strategic objectives from the Aggregate Measures Table in combination with actual historical sales data). The general optimization methods include Ant Algorithms, Genetic Algorithms, Tabu Searches, Branch and Bound, Clustering Methods and Simulated Annealing. Because new optimization schemes are constantly developed, the system allows for the incorporation of any user defined Optimization Method.

For specific planning models, methods that are more efficient than the general optimization methods may exist. In an enterprise planning model where both the primary objective and the strategic objectives have no terms that impact the same decision variables, each decision variable can be independently optimized, thereby saving a tremendous amount of time. In some cases it is even possible to produce a simple analytic expression for the optimum values.

Figure 3:
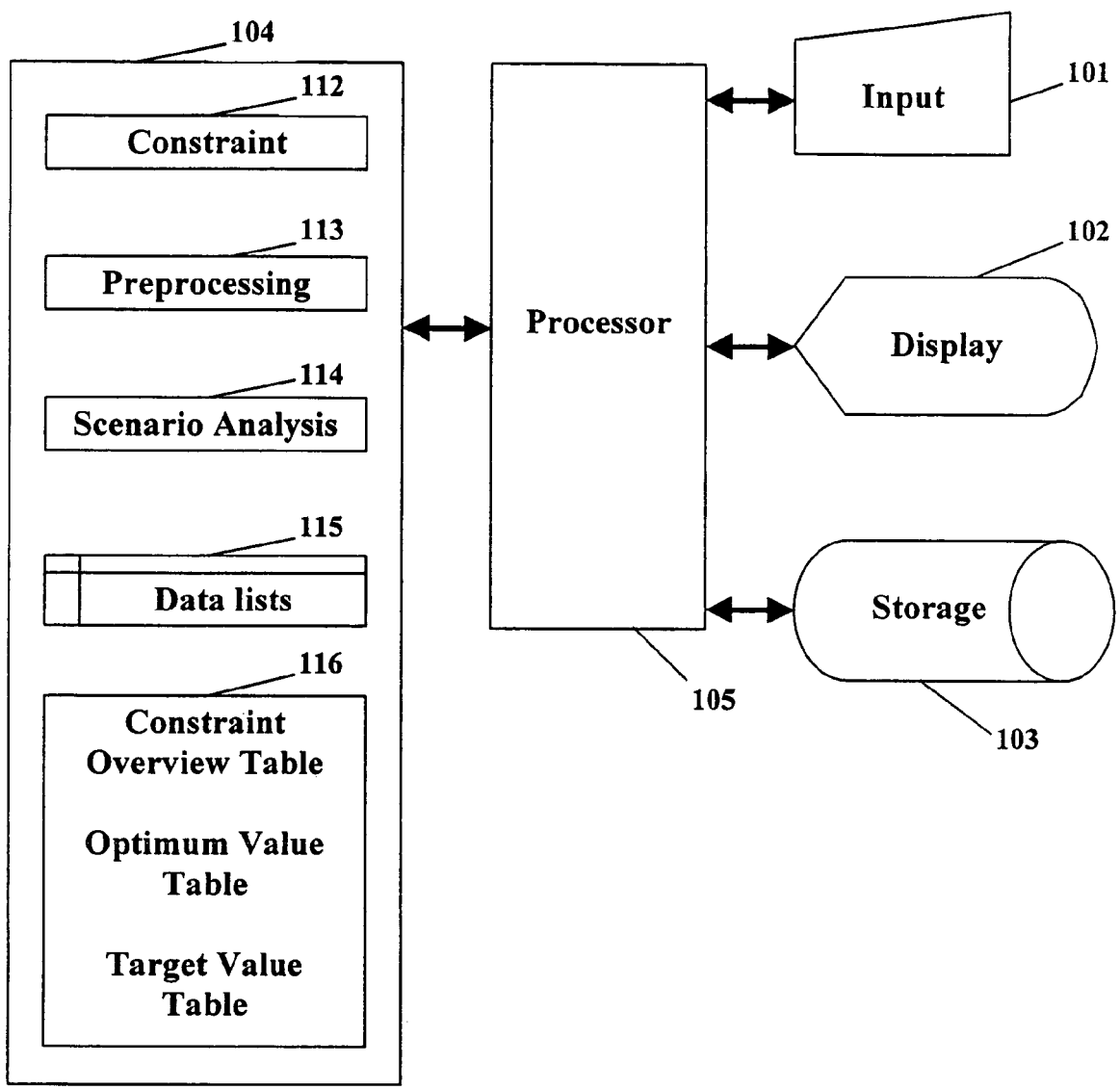
FIG. 3 is a high level block diagram of a general purpose computer system used with the present invention.

As shown in FIG. 3, a system includes: an input device 101 such as a keyboard, through which a user enters commands, inputs functions, etc.; a display device 102 for displaying tables, etc.; a storage device 103 such as hard disk drive for storing results and enterprise data; a memory 104 for storing program instructions, tables and results; and a processor 105 for performing various kinds of processing and controlling the overall operation of the system. These instructions include, for example, a Constraint Mapping routine 112, a Preprocessing routine 113, and a Scenario Analysis routine 114. Tables and results may include, for example, data lists 115 and a table portion 116. Table portion 116 may have a Constraint Overview table, and Optimum Value table, and/or a Target Value table stored therein in response to the execution of the aforementioned instructions. Of course, this representation is merely schematic and all or part of the system may exist as a network device.

It will be understood that the described embodiments of the present invention are embodied as computer instructions stored in memory 104 and executed by processor 105. These instructions can also be stored on a computer readable medium, such as a floppy disk, CD ROM, etc., and can also be transmitted in a network such as the internet, an intranet, etc., via a carrier wave embodying the instructions.

Operation of the Invention

The operation of a preferred embodiment of the present invention will now be described in brief with reference to FIGS. 4 and 5 before being described in detail with reference to FIGS. 6 to 9.

Figure 4:
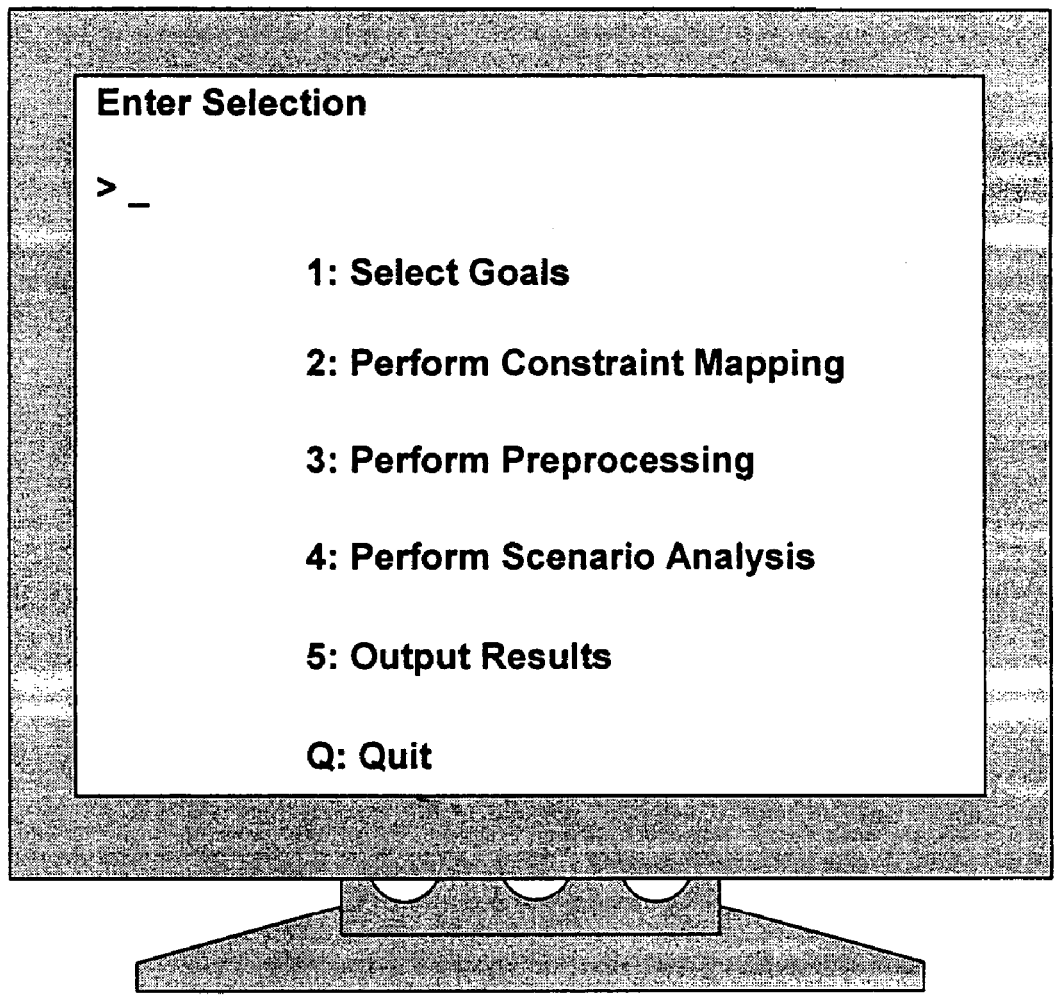
FIG. 4 is a picture of an example of an input menu displayed on a display device.
Figure 5:
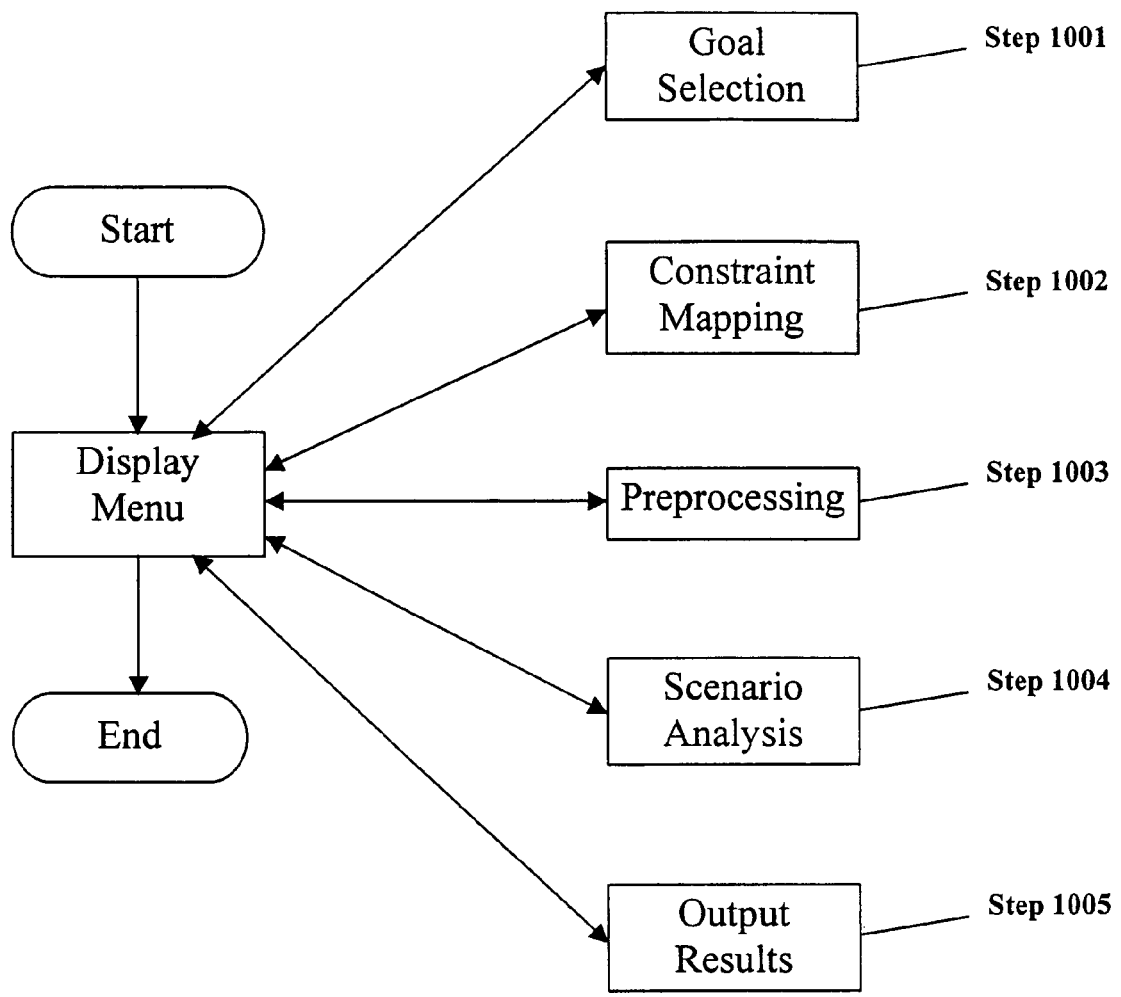
FIG. 5 is a flowchart describing the overall operation of the system.

A menu as shown in FIG. 4 is presented to the user on the display 102. At this time, the user enters one of the following selections through the input device 101: '1' to select from the Aggregated Measure Table, '2' to perform constraint mapping routine 112, '3' to perform preprocessing routine 114, '4' to perform scenario analysis routine 114, '5' to output results to the storage device 103, and 'Q' to terminate use of the system. Other appropriate user interfaces covering other methods and formats of input can, of course, be used.

The processor 105 receives the entered information, and the situation of the system is passed to one of the appropriate steps described below, according to the inputted value. This is represented schematically in FIG. 5.

(Step 1001): Goal/Objective Selection

At this step, the user selects a primary goal or objective to be analyzed, along with secondary goal(s) and strategic objective(s). A convenient manner of making the selection is use of the Aggregate Measures Table. The system is aware of the composite nature of many of the entries and derives multiple goals and strategic objectives from one or more table entries. Alternatively, the goal(s) and strategic objective(s) can be individually selected from separate Goals and Strategic Objective tables. The details thereof are discussed below in conjunction with FIG. 6. Normally the principal goal is denoted as the "Primary Goal or Objective". There may actually be more than one primary goal selected in which case the goals are either treated in order with successive optimizations or are given different weights and optimized simultaneously. Besides the simple or compound primary goal, there may be an additional Strategic Objective. With a Strategic Objective, the Primary Goal is optimized for a Strategic Objective target or over a range of target values for the Strategic Objective. Keep in mind that the primary goal/objective is subject to actual physical limitations/constraints whereas there are no direct physical constraints on the Strategic Objective. By looking at how the Primary Objective is altered by the Strategic Objective, the manager obtains a clear picture of the economic cost of implementing the Strategic Objective. The Strategic Objective may also be compound wherein the various strategic components are given different weights.

(Step 1101)

After the user selects the primary goal to be realized—e.g., maximization of gross profits, the primary goal is represented by a primary objective function, $\Pi$. The primary objective function, $\Pi$, depends upon a set of variables $\{X_i\}$, each of which represent a single operational decision. For example, in the field of retail, a primary goal is normally the gross profit, $$\prod = \sum_i Q_i (P_i - C_i),$$

where $Q_i = Q_i(P_i)$ is the predicted demand $Q_i$ for an item i based on its price $P_i$, and $C_i$ is the item's cost. In this case, the variables $\{X_i\}$ would be the set of all prices $\{P_i\}$. The primary goal may be defined by any model that attempts to optimize many operational decisions, i.e., those decisions that occur on a lower level. In a preferred embodiment, a plurality of objective functions corresponding to each of a plurality of predetermined goals will be stored in storage 103, and provided to the user on display device 102. However, it is anticipated that the user can modify existing goals and/or create new goals.

(Step 1002)

Where the user has selected a Strategic Objective, this acts as an additional constraint on the enterprise model. This constraint should represent some global, large-scale objective that is not included in the primary objective function $\Pi$ that provides the definition of the primary goal. The Strategic Objective is represented by a constraint function $\phi$, and should depend on the same set of variables $\{X_i\}$ that the primary objective function $\Pi$ depends upon, or some subset thereof. Ideally the constraint function $\phi$ should be defined so that it reflects some aggregate property that the variables should attain. Significantly, the constraint function φ can be virtually any function that the user feels is important.

For example, the equation for the gross profit, which is given above, can be used as the primary objective function whose value is maximized by adjusting prices on all items. Once maximized, the result is a set of prices for each item that maximizes the overall gross profit. On the other hand, the user might also like to set prices so as to achieve a particular level of sales—i.e., a Strategic Objective of achieving a particular level of sales. A suitable strategic constraint function for the total amount of sales, can be defined as $$\phi = \sum_i Q_i P_i$$

where $Q_i$ and $P_i$ are defined as above. This constraint function depends on all prices and demands, and for a given value of total sale, there could be many combinations of quantities ($Q_i$) and prices ($P_i$) that would give the same answer. However, the actual combination chosen to optimize total sales will depend upon the optimization of the primary objective function Π, as will be discussed below.

The primary goal/objective of the present invention can be any standard goal (or a compound goal) of an enterprise planning model, such as the maximization of gross profits. The Strategic Objective (or compound strategic objectives) can be any strategic factors that the user seeks to analyze in conjunction with the primary goal/objective, for example, increase or decrease of price image. As an example, a retail pricing manager may seek to set prices such that gross profits are maximized while at the same time, meeting the store's other long term goals, such as maintaining a particular price image.

It will be appreciated by those having ordinary skill in the art that prior art enterprise planning models are limited by the physical constraints of the enterprise planning model. Thus, the operational decisions that are recommended by the model will likely deviate from strategic considerations that are not specifically built into the enterprise planning model. This is a primary reason that retailers have traditionally avoided the use of demand models to help them price their products; namely, the results cannot reflect the company's overall strategic policies. As will be appreciated by this discussion, by incorporating strategic objectives into the enterprise model, the present invention provides an enterprise planning model that goes far beyond the physical constraints of traditional enterprise planning models.

(Step 1002): Constraint Mapping

With a Primary Goal and a Strategic Objective the behavior of the Primary Goal is determined over a range of values of the Strategic Objective. In the situation mentioned above, gross profits would be maximized (optimized) over a range of expected market share values. These data points are then recorded in a Constraint Table that is used to set bounds for the model. The details of Constraint Mapping routine 112 (FIG. 3) are discussed below in conjunction with FIG. 8.

(Step 1003): Preprocessing

Figure 11:
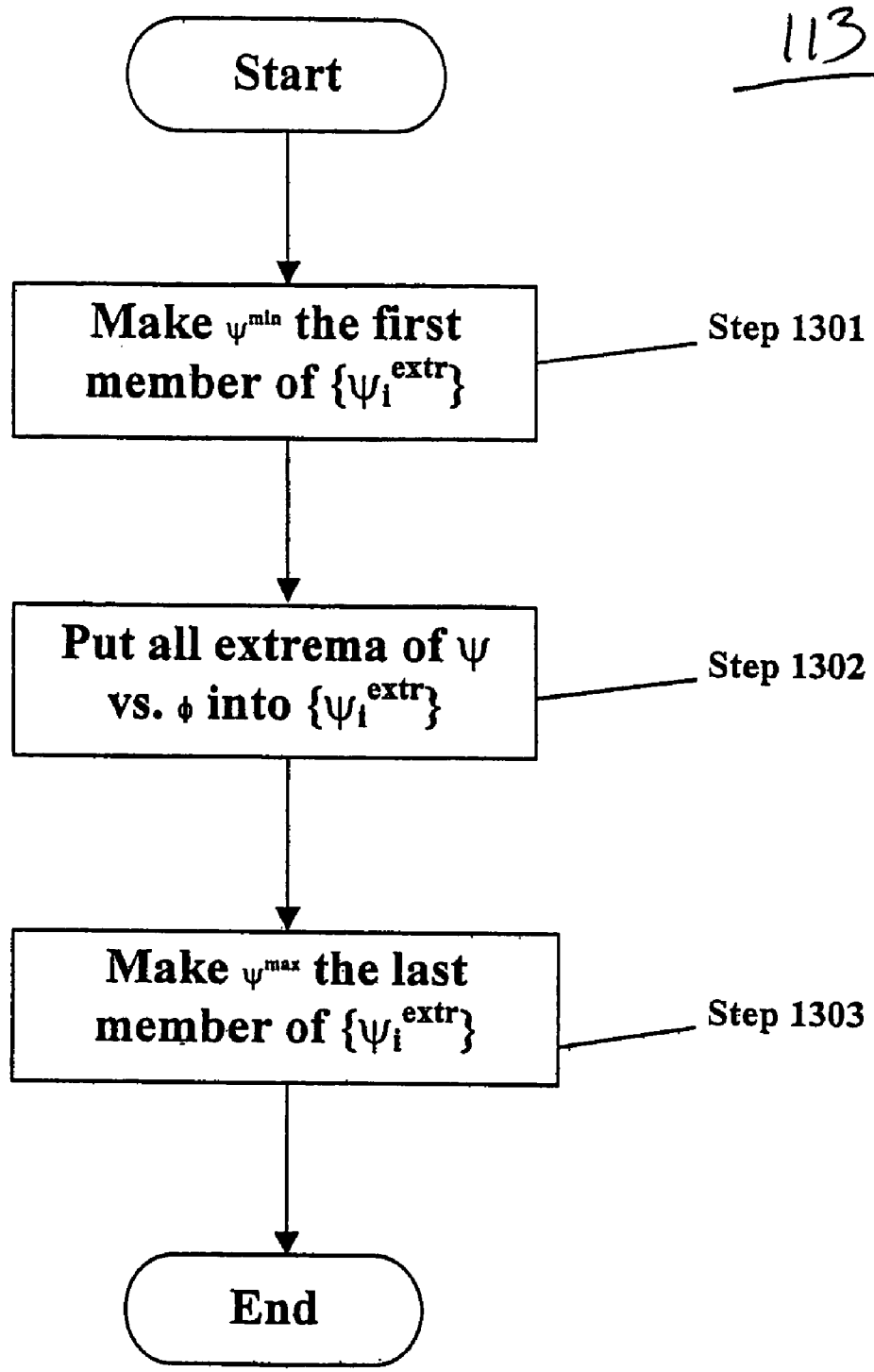
FIG. 11 is a flowchart of a preferred embodiment of the Preprocessing routine.

To provide the system with an efficient method to analyze various scenarios for achieving the primary and auxiliary goals (i.e., Scenario Analysis, discussed below), the data generated in the Constraint Mapping step are preprocessed. The details of Preprocessing routine 113 (FIG. 3) are discussed below in conjunction with FIG. 11.

(Step 1004): Scenario Analysis

Next the system defines a set of scenarios, i.e., projected values for the Strategic Objective that the user would like to achieve. For each scenario defined, a set of operational decisions are provided that maximize the Primary Goal while simultaneously satisfying the Strategic Objective. This step is performed for each scenario selected by the user. The details thereof are discussed below in conjunction with FIG. 12. Referring to the example provided above, the present invention provides the pricing manager with the necessary information to achieve both the Primary Goal (e.g., maximize gross profits) and a Strategic Objective (e.g., increase market share)—results that are not provided in prior art enterprise models.

(Step 1005): Output Results

The operational decisions, primary goal, and auxiliary goal determined for each scenario are placed in the storage device 103. Thus, in the retail pricing example given above, the retail pricing manager would be provided with the optimum prices for each item to be sold that would allow the store to meet both the Primary Goal of maximizing gross profits, and the Strategic Objective of increasing market share. By optimizing gross profit over a range of possible market shares the manager can see how much profit must be given up for each incremental increase in market share. This is vital in making informed strategic decisions.

Goal Selection

Figure 6:
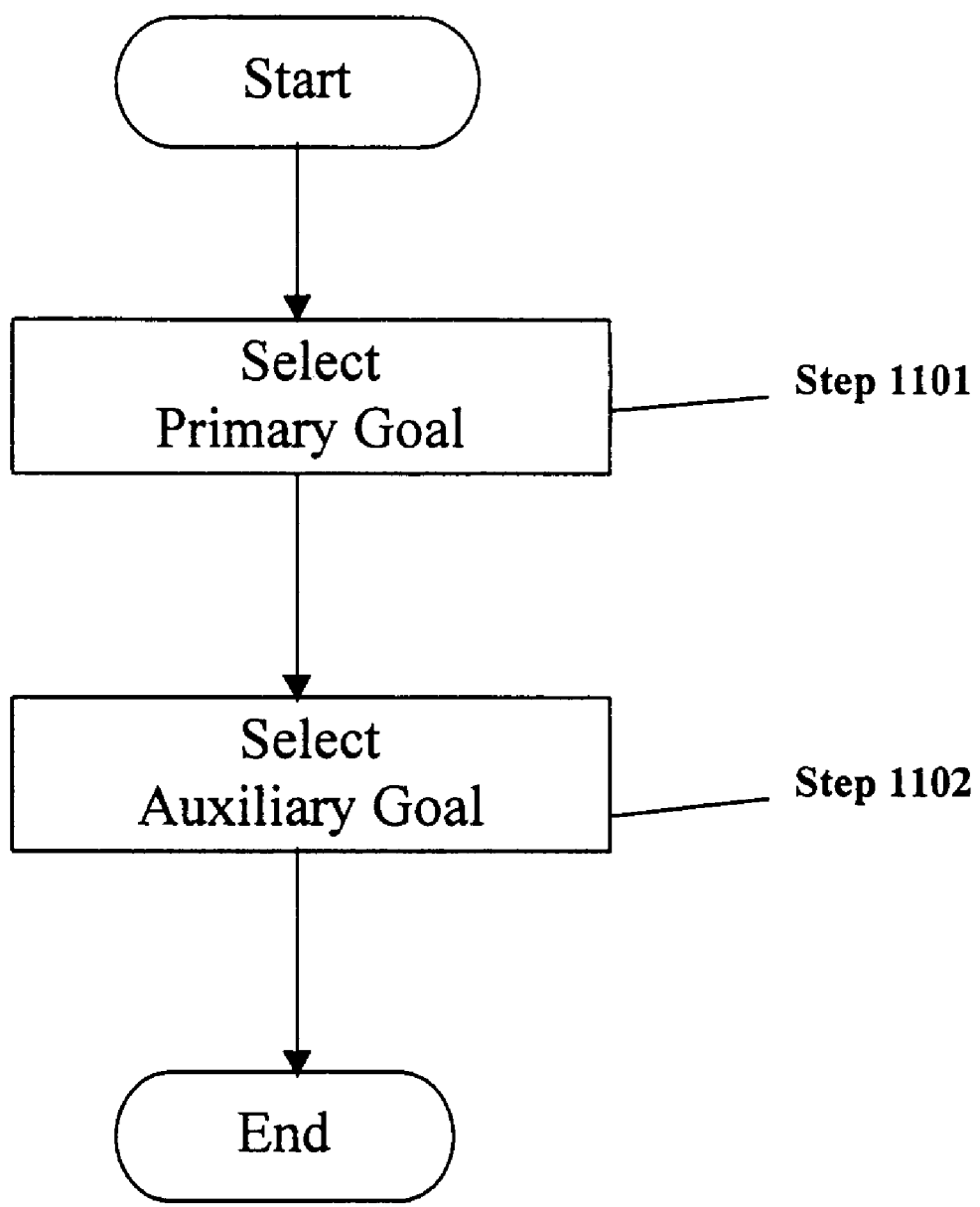
FIG. 6 is a flowchart of a preferred embodiment of the Function Selection routine.
Figure 8:
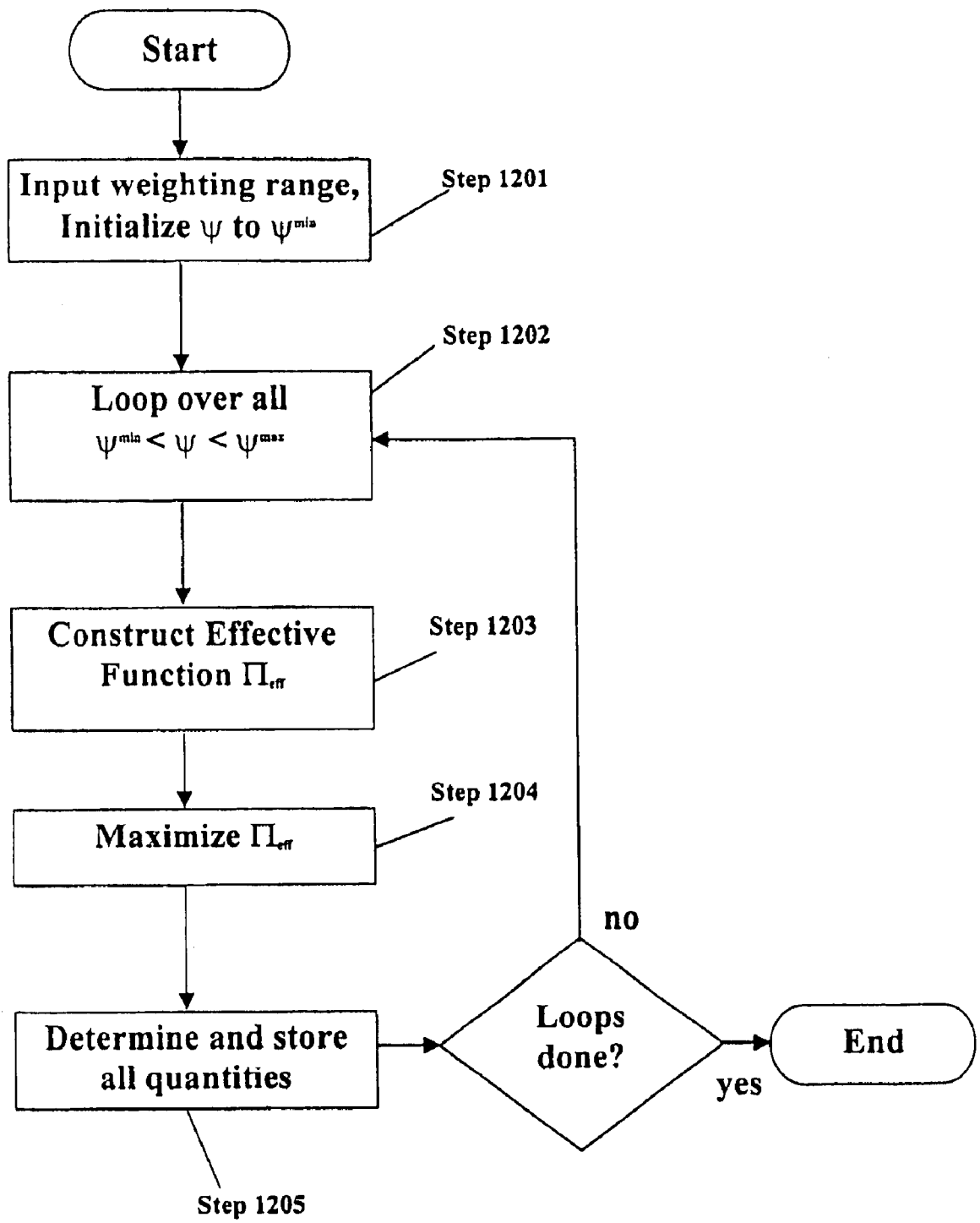
FIG. 8 is a flowchart of a preferred embodiment of the Constraint Mapping routine.

A preferred embodiment of this routine is described with reference to FIGS. 6 and 7. The user is presented with a menu on display 102, such as illustrated in FIG. 7, to prompt the user through the Goal Selection routine as illustrated in FIG. 6. It should be appreciated that other appropriate methods and formats of input can, of course, be used, and that the menu presented in FIG. 7 is presented for illustrative purposes only.

The addition of a Strategic Objective to the enterprise model allows the user to analyze enterprise planning decisions otherwise not available in the prior art. For example, when pricing their products, retail pricing managers generally seek to have their prices reflect a certain image of their stores. A discount retailer would like its prices to be perceived as being lower than other retailers. This so-called "price image" is an example of a strategic constraint; it does not correspond to any physical constraint on the prices, and it does not directly correspond to any single decision made by a enterprise planning model. Instead, it is a function of all the prices in the market, and it represents a higher-level property that the pricing manager would like to be able to choose and control with precision.

As illustrated in FIG. 7, a preferred embodiment includes, in addition to other Strategic Objectives, a mathematical definition of the price image. Thus, the present invention could be used to control the prices predicted by any demand model to ensure that a particular desired price image is attained. A preferred definition of a price image is $$\phi = \frac{1}{N} \sum_{i=1}^{N} \frac{P_i}{\overline{P}_i} \times w_i,$$

where $\overline{P}_i$ is the average price of item i in the market of interest, $w_i$ is a weighting function for item i and N is the total number of items in the model. The weighting function is suitably defined such that other factors can modify the contribution of a single item to the overall price image. For example, $w_i$ could be proportional to the sales of the item, so that items that are not frequently sold do not influence the price image as much as items with high sales. In the absence of any relevant information, the weighting functions may simply be set to 1. It should be apparent that other definitions, such as the one presented earlier, of price image can be utilized, and that the above definition is presented for illustrative purposes only.

The price image can be used in conjunction with the present invention to address a long-standing problem with retail demand modeling. Retailers have found that if a demand model is used to optimize prices on items to yield the greatest gross profit, the model will invariably choose prices that are higher than what a human price manager would have intuitively chosen. The typical outcome is that, in the short term, shoppers continue to buy products at these higher prices, and this does in fact yield a higher gross profit. However, over the long term, customers become aware that the price image of the store has risen, and eventually turn to other stores. Thus, controlling the price image from the outset can prevent this problem with different consumer responses on different time scales. By determining one's price image from existing prices, a retailer could then use a demand model, in the context of the present invention, to obtain greater profit even while maintaining the same overall price image.

Constraint Mapping

Because a strategic constraint (Strategic Objective), such as price image, does not represent a physical restriction on the system, it is not necessary that it be met rigorously. Rather, it is more desirable to vary the constraint over a range of scenarios, and then determine which set of predicted decisions aligns most favorably with the Primary Goal and the Strategic Objective. The object is to have control over the decisions being made, without being locked to a single set of decisions. For this reason, it is not practical to use conventional constraint-based optimizations, which are usually employed for physical constraints. A more efficient method for treating strategic constraints is described below.

By obtaining solutions over a broad range of scenarios, the user of the invention obtains a picture of how the optimal predictions vary according to changes in the desired large-scale goal. After seeing this picture, the user may target a specific large-scale scenario to be realized and subsequently obtain the set of decisions that are the most optimal, given the constraints of that particular scenario. The method can be used with a wide variety of models and objective functions.

The input to Constraint Mapping routine 112 includes the primary goal as represented by the primary objective function $\Pi$, the set of independent variables $\{X_i\}$ that affect the Primary Objective function $\Pi$, and a mathematical definition, i.e., the constraint function $\phi$ for the Strategic Objective, all of which are stored in memory 104 and/or storage 103. A preferred embodiment of Constraint Mapping routine 112 is described with reference to FIG. 8.

(Step 1201)

At this step, the user is prompted to select the extent to which the Strategic Objective will affect the Primary Goal. To achieve this, the user enters a minimum value $\psi^{min}$, a maximum value $\psi^{max}$, and the resolution $\delta\psi$ which represents step increments to be tested between $\psi^{min}$ and $\psi^{max}$. FIG. 10 illustrates user prompts that may be displayed on display 102 in this step. The actual value of each of these variables will depend upon the particular situation being studied. To begin the constraint mapping, the value for $\psi$ is initialized to $\psi^{min}$.

In addition, the system can be allowed to automatically select a range of $\psi^{min}$ to $\psi^{max}$ that is based on general ranges shown to be useful.

(Step 1202)

A loop is begun in which the variable $\psi$ takes on values between $\psi^{min}$ and $\psi^{max}$ incremented by $\delta\psi$.

(Step 1203)

The routine constructs an effective objective function:

$$\Pi_{eff} = \Pi - \phi\psi.$$

It is important to note $\Pi_{eff}$ depends on the same variables $\{X_i\}$ as the primary objective function, and represents an effective goal. As can be seen above, the effective objective function is constructed by taking the primary objective function and subtracting the constraint function as weighted by the value of $\psi$.

(Step 1204)

At this step, the effective objective function $\Pi_{eff}$ is maximized with respect to all the independent variables, and the enterprise data is stored in the storage device 103. A useful method of maximizing $\Pi_{eff}$ is the method of simulated annealing because it is one of the few techniques available for solving discrete, nonlinear, high-dimensional functions. This technique is known in the art and is documented in the following reference, which is herein incorporated by reference: W. Press et. al., *Numerical Recipes: The Art of Scientific Computing*, Cambridge University Press, New York (1992).

The simulated annealing technique is well suited for this problem for several reasons. In a typical situation there are possibly thousands of independent variables that correspond to thousands of operational decisions, and there are very few techniques that can optimize an objective function with this many variables in an efficient amount of time. In addition, the primary objective function and the constraint (strategic) function will typically depend upon many discrete variables, for example, price which can only change in units of cents. The simulated annealing technique is able to handle this complication, and in fact is ideally suited for optimizations involving discrete variables. Other optimization routines can be utilized and may be more efficient in some situations, for instance, when the types of decisions that influence the objective function are captured by continuous variables, or when the system to be studied is very small.

The variable $\psi$ serves the purpose of being a reward or a penalty. When the value of $\psi$ is equal to zero, the effect of the auxiliary (strategic) function on the aforementioned optimization procedure is not felt at all, and optimization of the effective objective function amounts to an unconstrained optimization of the primary goal. Therefore, it would generally be useful to define $\psi^{min}$, $\psi_{max}$, and $\delta\psi$ such that $\psi$ is zero during at least one point in the iteration procedure. If the value of $\psi$ is large and positive, then the constraint acts as a penalty, and the optimization will be skewed towards a solution that results in a lower numerical value of the constraint function. If the value of $\psi$ is large and negative, then the constraint acts as a reward, and the optimization will be skewed towards a solution that results in a higher numerical value of the constraint function. The magnitude of $\psi$ serves to fix the relative weight of the constraint, and accordingly different values for $\psi$ will result in different numerical values of the constraint that will be attained when the objective function is optimized.

(Step 1205)

The output from step 1204 is the maximized value of $\Pi_{eff}$ and the resulting values for the independent variables $\{X_i\}$. These independent variables are stored in an Optimum Value table in Table portion 116 (FIG. 3) of memory 104. The values of the constraint function $\phi$ and the primary objective function Π are determined from these variables, and subsequently, Π, φ, and ψ are all stored in the Constraint Overview table in the Table portion 116 of memory 104, as shown in FIG. 9.

Next, the value of ψ is incremented by δψ, and a judgment is made as to whether ψ is greater than $\psi^{max}$. If it is not, the routine goes back to step 1202. If it is, the Constraint Mapping procedure terminates.

Figures 15, 16:
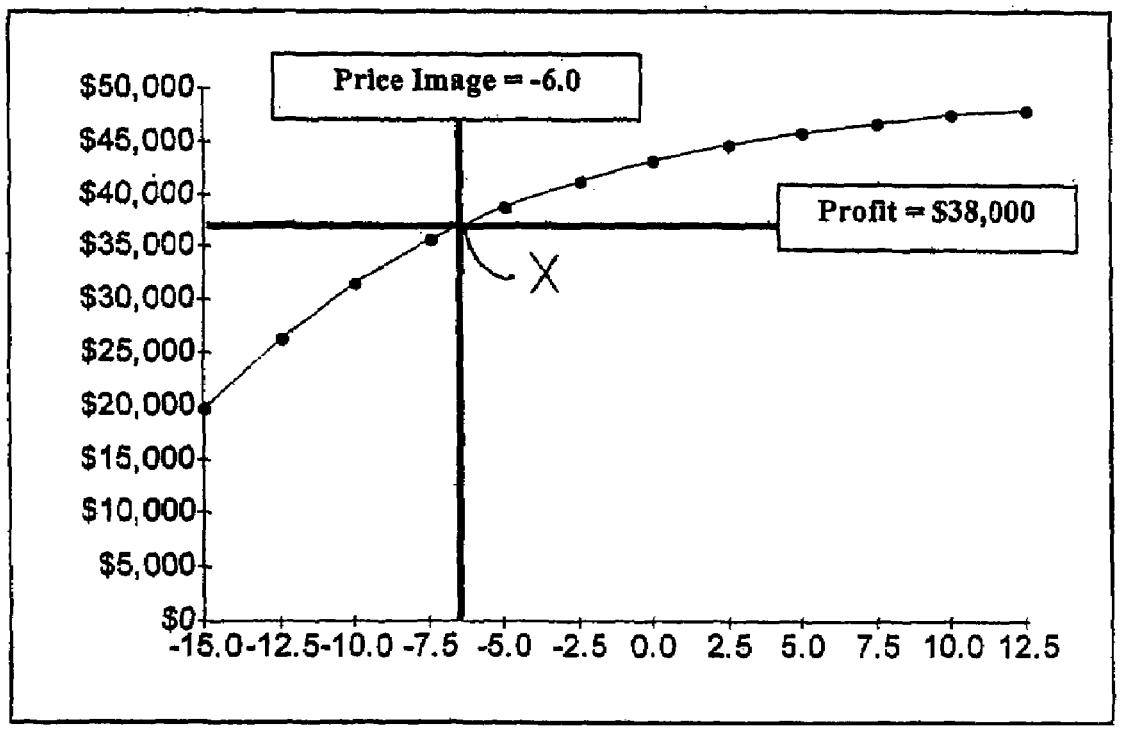
FIG. 15 gives a schematic of the determination of quantities used for the interpolation of the Constraint Overview table.
FIG. 16 gives a graph presented on the display device of the data contained in an example Constraint Overview table, and an example of the targeting of a particular Price Image.

The information stored in the Constraint Overview table provides a concise summary of the behavior of the target market—i.e., a summary of the effect that the Strategic Objective will have on the Primary Goal. These data may be stored in a file or printed, or passed on to another routine. For example, since the table contains various Primary Goal values for each set of values determined from the Strategic Objective, data from the table may be used as input to a visualization routine or package. In one embodiment, the user is provided with an intuitive, graphical view of the dependence of the Primary Goal on the target value of the Strategic Objective, as illustrated in FIG. 16 or FIG. 1.

After obtaining data in the Constraint Overview table, and possibly visualizing it or comprehending it in some other manner, the user may choose to terminate the operation of the system, or proceed to Preprocessing routine 113 (FIG. 3).

Preprocessing Routine

In one embodiment, before the data contained in the Constraint Overview table are used to generate a forecast for a specific scenario (see discussion of Scenario Analysis below), it is preprocessed into a computationally efficient form. This step generates information for use in subsequent operations. Without preprocessing, the subsequent Scenario Analysis routine would have to be performed in a much less efficient manner, and the additional computation time would likely be undesirable for the user. A preferred embodiment of Preprocessing routine 113 is described with reference to FIG. 11.

(Step 1301)
A list $\{\psi_i^{extr}\}$ is created, and $\psi^{min}$ is made the first entry in the list.

(Step 1302)
The values of ψ in the Constraint Overview table are scanned from $\psi^{min}$ to $\psi^{max}$. Anytime an extremum is found, that is, a point where the constraint function φ attains a local minimum or maximum, the value of ψ at this point is added to the list $\{\psi_i^{extr}\}$. As will be discussed further below, the local minimums and maximums are obtained so that any value in the weighting range, $\psi^{min}$ to $\psi^{max}$, can be efficiently interpolated.

(Step 1303)
$\psi^{max}$ is made the last entry in $\{\psi_i^{extr}\}$.

The list $\{\psi_i^{extr}\}$ contains the ψ value of endpoints of successive segments in the Constraint Overview table where the constraint function φ representing the Strategic Objective, is monotonic increasing or monotonic decreasing. In the trivial case where the constraint function φ is monotonic increasing or monotonic decreasing throughout the entire list, then $\{\psi_i^{extr}\}$ contains only the lowest and highest values of ψ, respectively, in the Constraint Overview table.

Scenario Analysis Routine

Figure 12:
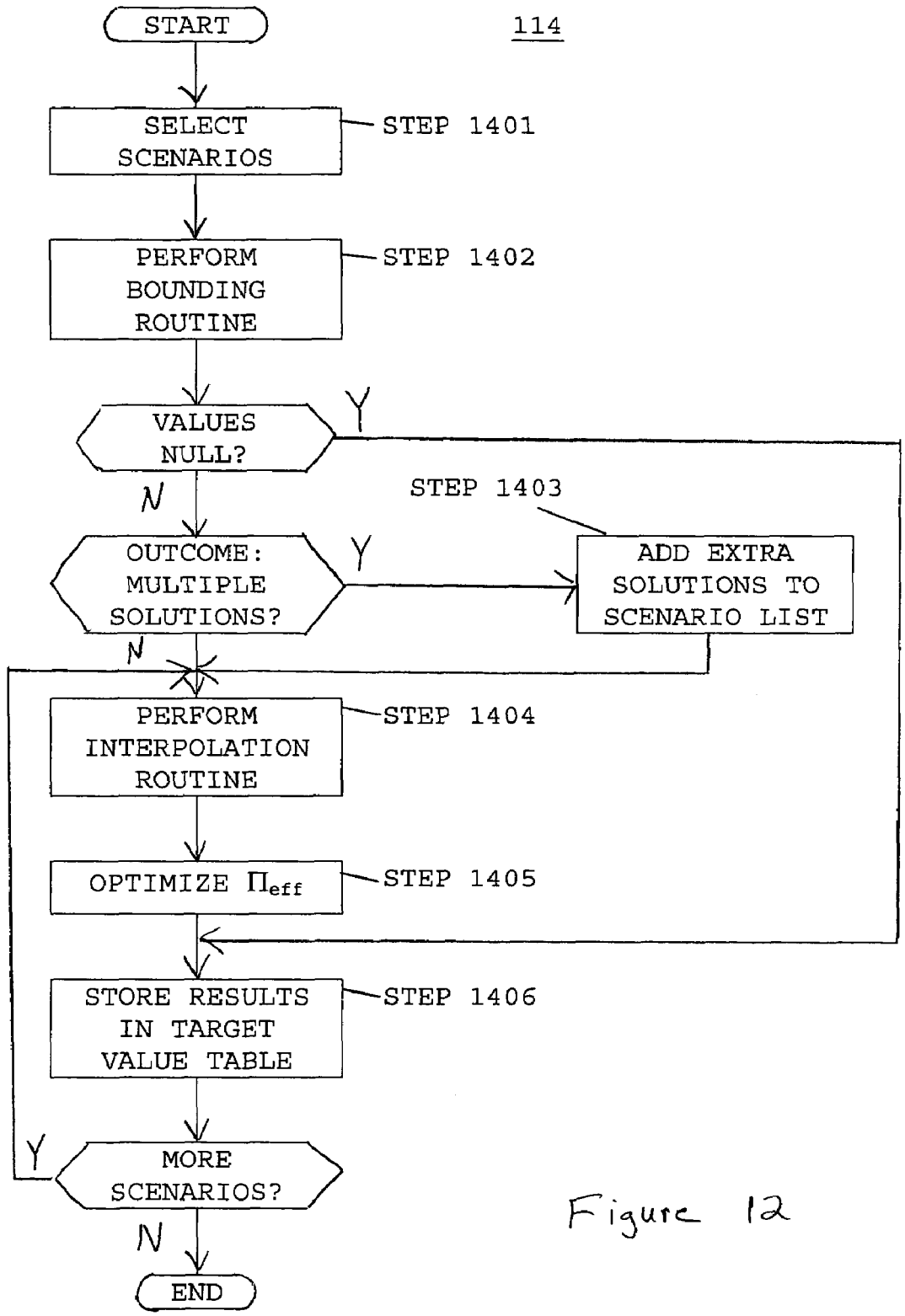
FIG. 12 is a flowchart of a preferred embodiment of the Targeting routine.

An embodiment of Scenario Analysis routine 114 (FIG. 3) is described with respect to FIG. 12.

(Step 1401)
The user selects a set of scenarios—i.e., specifies values for the Strategic Objective that the user would like to see attained—for example, a particular gross margin or level of total sales.

(Step 1402)
Control of the system is first passed to the Bounding routine. The input to this routine is the Constraint Overview table obtained in Constraint mapping routine 112 (FIG. 8), and all the values of the constraint to be targeted, as well as the list $\{\psi_i^{extr}\}$. The outputs from the Bounding routine are the values $\psi^{low}$ and $\psi^{high}$ which correspond to the entries in the table which bound all target values of the constraint function φ.

If the values of $\psi^{low}$ and $\psi^{high}$ for a particular constraint target are null, this indicates that the desired scenario is not contained within the bounds of the Constraint Overview table. In this case, the situation of the routine skips directly to step 1406. If the user wishes to analyze the particular scenario that was rejected, then the Constraint Mapping routine may be run again, with different values of $\psi^{min}$ and $\psi^{max}$ in order to extend the range of the analysis. If this extended map still does not capture the desired scenario, then it is likely that the user has chosen to analyze a scenario that is impossible to attain.

(Step 1403)
If a particular target value occurs in more than one place in the Constraint Overview table, that is, if there are multiple solutions, then each of these becomes a scenario of its own. These scenarios are added onto the list of targeted constraint values.

(Step 1404)
For each scenario that does not have null values for the bounds, the values $\psi^{low}$, $\psi^{high}$, the particular constraint target and the Constraint Overview table are passed to the Interpolation Routine. The output from this routine is an estimate of the value of ψ (denoted $\psi^{est}$) that, when used to optimize the effective objective function, will yield a value of the constraint function φ close to constraint target.

(Step 1405)
The effective objective function is constructed:

$$\prod_{e\!f\!f} = \prod -\phi\psi^{est}.$$

$\Pi_{e\!f\!f}$ is optimized with respect to all the independent variables. Again, an effective method is the simulated annealing technique, though others could be used. The output from the optimization routine includes the optimized values of the independent variables, such as the price and quantity for each item, and the resulting values of the objective function and constraint function.

The resulting constraint value is the one that most closely matches the target constraint value. The level of agreement will depend in part upon the nature of the system being analyzed and in part on the resolution of the mapping.

(Step 1406)
The values of the independent variables, the resulting objective function and the constraint function are stored in the Target Value table. A judgment is made as to whether all the scenarios have been analyzed. If they have not, the situation of the routine returns to 1404; otherwise, the Scenario Analysis routine 114 terminates.

Although in the routine described above, the Interpolation routine was used to obtain the estimate $\psi^{est}$, in an alternative embodiment this quantity may be determined by used of a root-finding technique. Many such techniques are well known in the art, and the particular choice will depend upon the known qualities of the system. One particular root-finding technique that is appropriate for discontinuous functions is the Van Wijngaarden-Dekker-Brent method, which is documented in W. Press et. al., *Numerical Recipes: The Art of Scientific Computing*, Cambridge University Press, New York (1992), and is herein incorporated by reference. The use of a root-finding technique is particularly desirable if the desired constraint target needs to be met with high accuracy. However, the root-finding technique will be computationally intensive for virtually every optimization of the effective objective function $\Pi_{eff}$. By contrast, the Interpolation routine makes use of data that have already been calculated and stored in the Constraint Overview table, making the scenario analysis computationally efficient.

FIG. 16 provides an example of how the predicted profits from a demand model could vary according to the price image of the particular group of items. By using competitive data, a retail pricing manager could find out the price image of all the other stores competing in the market with their store. For example, suppose the manager determines that the store should have a price image of −6.0 (measured relative to the market), this corresponds to choosing a value −6.0 from the horizontal axis, and then having the system optimize prices such that the point X on the graph is attained, realizing a profit of $38,000. Note that the manager can also use this display to determine how much more profit a less negative price image would yield.

Bounding Routine

Figure 13:
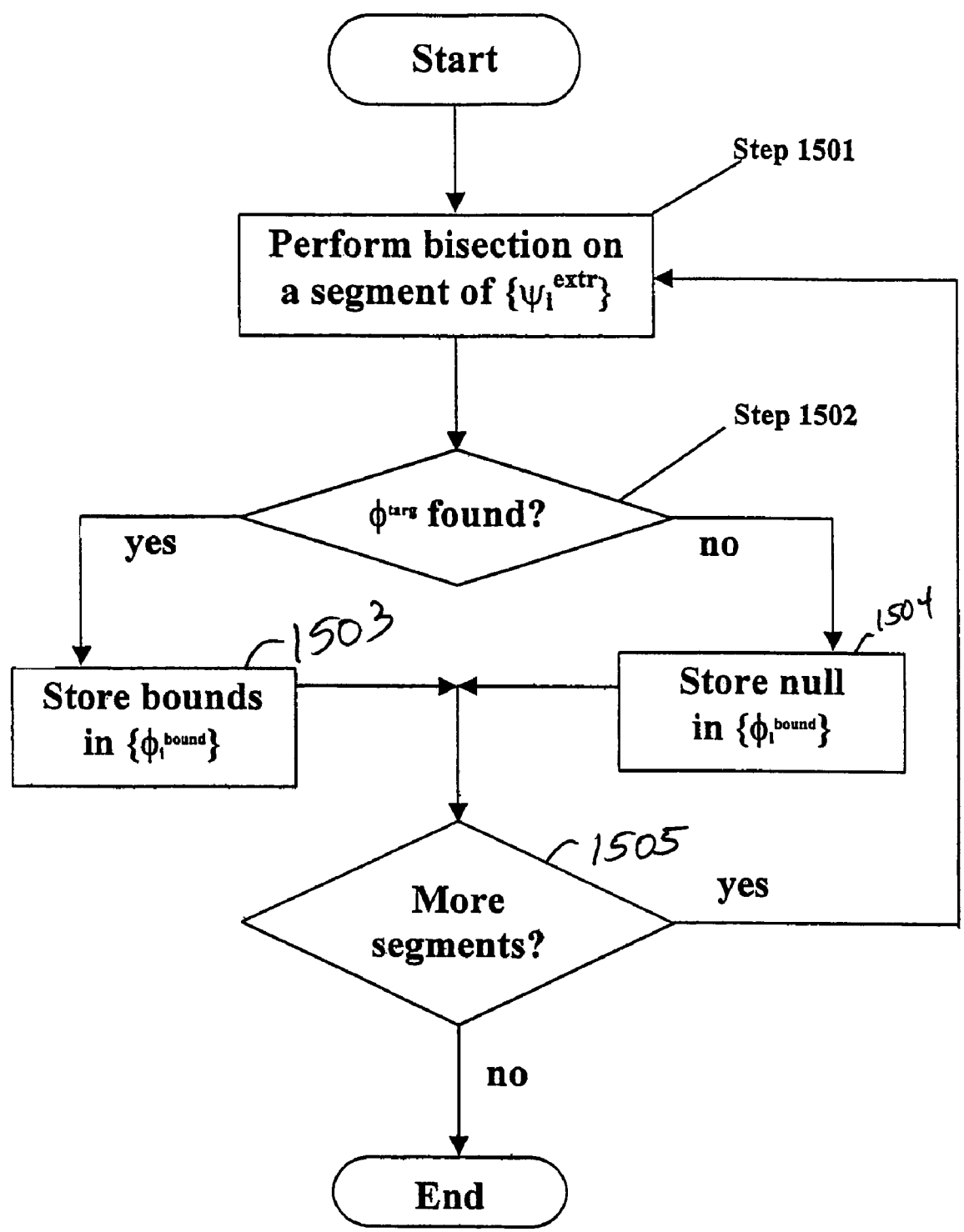
FIG. 13 is a flowchart of a preferred embodiment of the Bounding routine.

The purpose of the Bounding routine is to determine the location in the Constraint Overview table in which the target value for the constraint functions can be found. The input to this routine is the Constraint Overview table, the constraint target value and the list of local minimums and maximums for $\psi$, denoted $\{\psi_i^{extr}\}$. The output from this routine is the entries in the table that bound these target values. A preferred embodiment of the Bounding routine is described with reference to FIG. 13.

(Step 1501)

For each segment defined by $\{\psi_i^{extr}\}$, a bisection routine is performed to determine if the constraint target $\{\phi^{targ}\}$ is contained in that segment.

(Step 1502)

If the constraint target $\{\phi^{targ}\}$ is contained in that segment, then the bisection determines which entries in the Constraint Overview table corresponds to the bounds on the constraint target. These bounds, denoted as $\psi^{low}$ and $\psi^{high}$, for the lower and upper bounds, respectively, are stored in a list $\{\phi_i^{bound}\}$ at a step 1503. If the constraint target $\{\phi^{targ}\}$ is not contained in that segment, then a null value is returned at a step 1504.

At a step 1505, a judgment is made as to whether all the listed segments defined by $\{\omega_i^{extr}\}$ have been analyzed. If they have not, i.e., if there are no more segments, the control of the routine is returned to step 1501. If they have, $\{\phi_i^{bound}\}$ is returned to the calling routine, including the cases where these variables are null. Using the data from FIG. 9 as an example, $\{\phi_i^{bound}\}$ for a particular list of target values for $\phi$ is shown.

Interpolation Routine

Figure 14:
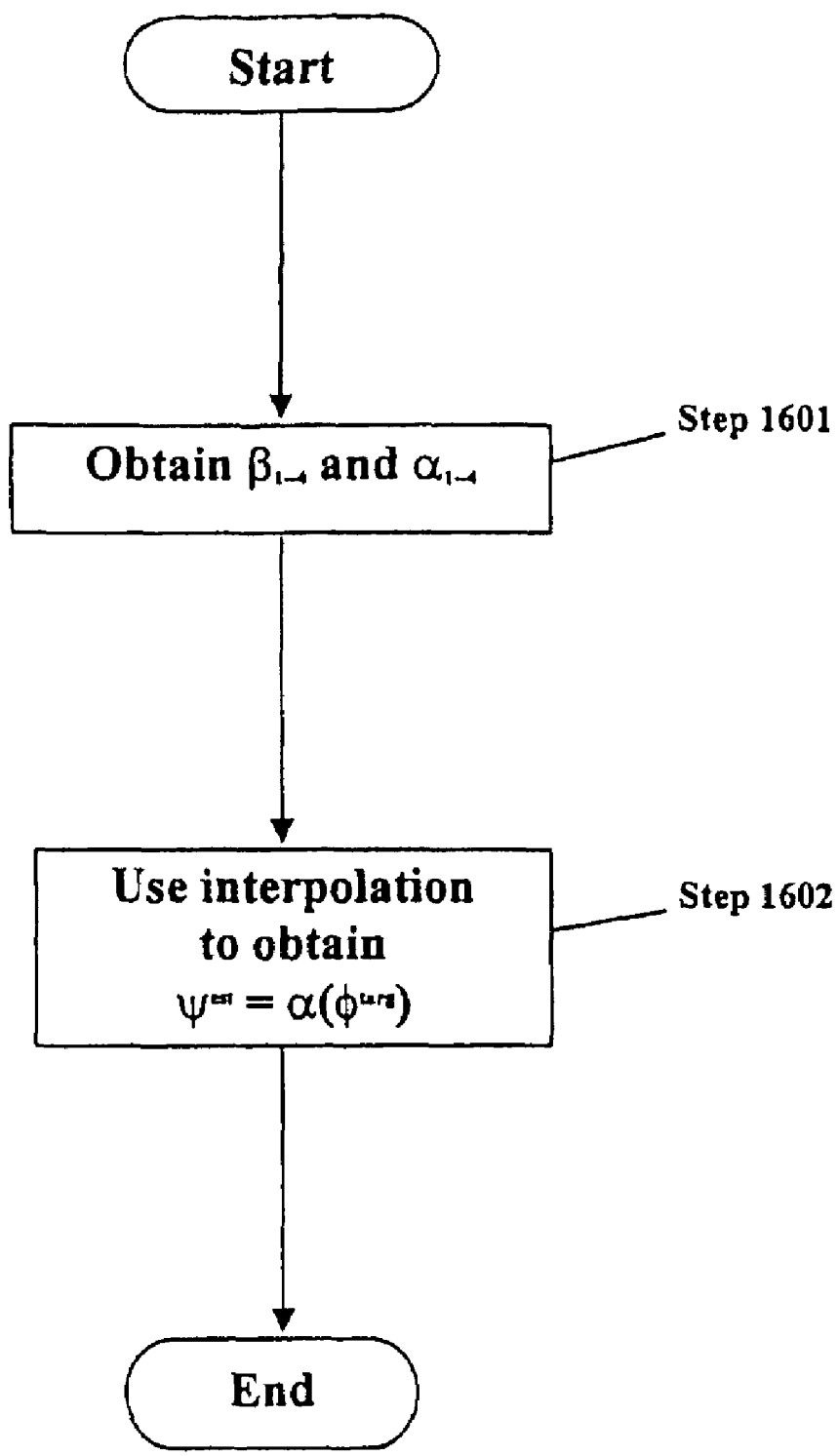
FIG. 14 is a flowchart of a preferred embodiment of the Interpolation routine.

This routine utilizes known interpolation techniques to interpolate a value of $\psi$ from the Constraint Overview Table. The input to this routine includes: the Constraint Overview table; the specified target values for the constraint functions, given by $\phi^{targ}$, and the values $\psi^{low}$ and $\psi^{high}$ which bound the location in the table where the desired solution is to be targeted. The output from this routine is the value $\psi^{est}$, which is an interpolated value of a function $\psi(\phi)$ that is constructed from the part of the table containing $\psi^{low}$ and $\psi^{high}$. In general, this interpolated value can be constructed from any prior art interpolation routine, as long as the routine makes use of the data in the Constraint Overview table that is near the entries $\psi^{low}$ and $\psi^{high}$; otherwise, the accuracy of the interpolation will be compromised. Below is shown one embodiment of this interpolation routine with reference to FIG. 14.

(Step 1601)

The two values $\psi^{low}$ and $\psi^{high}$ are assigned to the variables $\alpha_2$ and $\alpha_3$, respectively. The values of corresponding entries of $\psi$ in the table are assigned to $\beta_2$ and $\beta_3$, respectively. The value of the constraint function $\phi$ in the Constraint Overview table immediately below $\alpha_2$ is assigned to $\alpha_1$, and the matching value of the constraint function $\phi$ is assigned to $\beta_1$. The value of $\psi$ in the Constraint Overview table immediately above $\alpha_3$ is assigned to $\alpha\phi$, and the matching value of $\phi$ assigned to $\beta_4$. This is elucidated more clearly in FIG. 15. Note that this process is not affected by whether the Constraint Overview table is monotonic or not; the distinction is only used to determine whether or not there is a possibility of multiple solutions.

(Step 1602)

The values $\alpha_{1-4}$ and $\beta_{1-4}$ are used to construct an interpolated function $\alpha(\beta)$. This fourth-order interpolation is then used to obtain an approximation $\psi^{est}=\alpha(\phi^{targ})$. An effective method for doing this is Neville's algorithm, which is described in W. Press et. al., *Numerical Recipes: The Art of Scientific Computing*, Cambridge University Press, New York (1992), and is herein incorporated by reference. The estimated value $\psi^{est}$ is then returned to the calling routine.

If the values $\psi^{low}$ and $\psi^{high}$ are located near the ends of the Constraint Overview table, such that there does not exist two values in the table which are lower or higher than $\phi^{targ}$, then the values for the $\alpha$'s and the $\beta$'s would need to be chosen in a slightly different manner. If there is only one value of $\phi$ in the Constraint Overview table that was lower than $\phi^{targ}$, then this one would be made $\beta_1$, the next three entries higher than $\phi^{targ}$ would be made $\beta_2$ through $\beta\phi$, and the $\alpha$'s would be chosen accordingly. If there is only one value of $\phi$ in the Constraint Overview table that was higher than $\phi^{targ}$, then this one would be made $\beta\phi$, and the next three entries lower than $\phi^{targ}$ would be made $\beta_1$ through $\beta_3$, and the $\alpha$'s would be chosen accordingly.

If the Constraint Overview table contains fewer than 4 entries of $\phi$, then the fourth-order interpolation would have to be replaced with a lower-order method, such as linear interpolation.

Having thus described a preferred embodiment of the Method for Controlled Optimization of Enterprise Planning Models, it should be apparent to those skilled in the art that certain advantages of the method have been achieved. It should also be appreciated that numerous modifications, adaptations, and alternative embodiments thereof may be made within the scope and spirit of the present invention.

For example, the method described above may be extended to situations in which there is more than one Strategic Objective to be applied simultaneously. Instead of one constraint function $\phi$, representing one auxiliary goal, there would be a set $\{\phi_i\}$ of them-one constraint function for each Strategic Objective. Instead of a single variable $\psi$ there would be a set $\{\psi_i\}$, each member of which corresponds to one of the Strategic Objectives. The effective objective function would thus be defined as:

$$\prod_{\mathit{eff}} = \prod - \sum_j \psi_j \phi_j,$$

and the map would exist in two or more dimensions, each of which corresponds to one of the Strategic Objectives. The values of the $\psi_j$ would each be varied such that the multidimensional space spanned by them is captured by a discrete mapping within specified bounds $\psi_j^{min}$ and $\psi_j^{max}$ on each of the $\psi_j$. The simulated annealing technique could be used to perform the optimization of the effective objective function $\Pi_{eff}$. Finally, the Constraint Overview table would hold data for the entire multi-dimensional map.

For the Scenario Analysis routine, a scenario would include of a group of target values $\{\phi_i^{targ}\}_j$ that each of the constraint functions should attain simultaneously. The effective objective function would again be constructed in a manner similar to the one described above. The main difference for the multiple constraint implementation is the determination of $\{\psi_i^{est}\}_j$, which are the values for the $\{\psi_i\}$ that yield the targets $\{\phi_i^{targ}\}_j$. The Preprocessing, Bounding, and Interpolation routines would need to be adapted for multidimensional systems. However, once $\{\psi_i^{est}\}_j$ has been determined, the optimization of $\Pi_{eff}$ is again performed to yield the values for the independent variables that yield the desired $\{\phi_i^{targ}\}_j$ while optimizing the primary objective function $\Pi$.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. In an enterprise planning model, a computer program residing in memory and executable by a processor, said computer program enabling visualization of an effect of a strategic constraint on a primary goal of an enterprise, said computer program instructing said processor to perform operations comprising:

selecting said primary goal of said enterprise planning model from a plurality of primary goals;

representing said primary goal by a primary objective function, said primary objective function being affected by a set of operational variables, each of said operational variables representing an operational decision that a user seeks to optimize in order to reach said primary goal;

representing said strategic constraint by a constraint function, said constraint function being affected by a subset of said operational variables, and said strategic constraint being a factor that said user seeks to analyze in conjunction with said primary goal;

constructing an effective objective function by subtracting said constraint function weighted by a weighting factor from said primary objective function;

optimizing said effective objective function with respect to said operational variables over a range of values of said weighting factor for said constraint function to obtain operational decisions for said operational variables, said optimizing operation optimizing said effective objective function for each of said values of said weighting factor;

determining, from said optimizing operation, a plurality of outcomes of said primary objective function in response to said range of weighting factors; and presenting a graphical view of said plurality of outcomes of said primary objective function versus values of said constraint function corresponding to said values of said weighting factor such that effects of said strategic constraint on said primary goal can be readily perceived by said user to manage said enterprise.

2. A computer program as claimed in claim 1 wherein said computer program instructs said processor to perform further operations comprising:

selecting a set of scenarios for said strategic constraint; and for each of said set of said scenarios, providing a set of said operational decisions for said operational variables that optimize said primary goal while concurrently satisfying said strategic constraint.

3. A computer program as claimed in claim 2 wherein said computer program instructs said processor to perform further operations comprising:

enabling said user to target one of said scenarios from said set of said scenarios to be realized within said enterprise; and providing said set of said operational decisions associated with said one of said scenarios to said user.

4. A computer program as claimed in claim 1 wherein said computer program instructs said processor to perform a further operation of said optimizing operation comprising:

outputting said operational decisions for said set of operational variables that optimize said objective function while concurrently satisfying target values for said constraint function.

5. A computer program as claimed in claim 1 wherein said computer program instructs said processor to perform a further operation of said optimizing operation comprising selecting said range of weighting factors values of said weighting factor for said constraint function, said weighting factors values adjusting an effect that said constraint function has on said objective function.

6. A computer program as claimed in 1 wherein:

said primary goal is limited by physical constraints of said enterprise planning model; and said strategic constraint is non-limited by said physical constraints of said enterprise planning model.

* * * * *